(12) United States Patent
Hoel et al.

(10) Patent No.: US 7,602,528 B2
(45) Date of Patent: Oct. 13, 2009

(54) COMPOSITING PAGES FROM PAGE COMPONENTS

(75) Inventors: Jeffrey H. Hoel, Palo Alto, CA (US); Paul D. Gettner, Ben Lomond, CA (US); Joel B. Sacks, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 11/751,561

(22) Filed: May 21, 2007

(65) Prior Publication Data
US 2007/0211286 A1 Sep. 13, 2007

Related U.S. Application Data

(63) Continuation of application No. 10/848,425, filed on May 17, 2004, now Pat. No. 7,221,472, which is a continuation of application No. 09/362,360, filed on Jul. 28, 1999, now Pat. No. 6,753,974.

(51) Int. Cl.
G06F 15/00 (2006.01)
G06K 1/00 (2006.01)
H04N 1/60 (2006.01)

(52) U.S. Cl. ........................... 358/1.9; 358/539

(58) Field of Classification Search .................. 358/1.1, 358/1.9, 1.15, 2.1, 3.01, 3.02, 540, 539
See application file for complete search history.

(56) References Cited

U.S. PATENT DOCUMENTS

| 5,602,976 A | 2/1997 | Cooper et al. |
| 5,638,498 A | 6/1997 | Tyler et al. |
| 6,049,390 A * | 4/2000 | Notredame et al. ........ 358/1.15 |
| 6,348,969 B1 * | 2/2002 | Ikeda ........................ 358/1.15 |

OTHER PUBLICATIONS

U.S. Appl. No. 08/893,065, filed Jul. 15, 1997.

* cited by examiner

Primary Examiner—Douglas Q Tran
(74) Attorney, Agent, or Firm—Fish & Richardson P.C.

(57) ABSTRACT

Sets of pixel data defining parts of rasterized portions of an image are received. At least one of the parts of one of the rasterized portions of the image overlaps another part of that portion of the image. The pixel data that defines the overlapping part includes mask data that identifies pixels of the overlapping part that are to be included in the image. The sets of pixel data are decompressed. The decompressed data are used to generate a series of the rasterized portions of the image including the pixels identified in the mask data. While each of the rasterized portions of the image is being used by a print engine, another of the rasterized portions of the series is being generated.

10 Claims, 4 Drawing Sheets

COMPOSITING PAGES FROM PAGE COMPONENTS

This application is a continuation, and claims the benefit of priority under 35 U.S.C. §120, of U.S. application Ser. No. 10/848,425, filed May 17, 2004, entitled "Compositing Pages From Page Components," now U.S. Pat. No. 7,221,472, which is a continuation of U.S. application Ser. No. 09/362,360, filed Jul. 28, 1999, now U.S. Pat. No. 6,753,974, issued on Jun. 22, 2004. The disclosures of these applications are incorporated by reference herein.

BACKGROUND

This invention relates to compositing pages from page components.

To print an image, a page of text and graphics, for example, the image typically is sent to a print engine from a frame buffer as a rasterized set of pixel values. The original image data from which the rasterized pixel values are generated are often in a compressed format, which must be decompressed for use by the print engine.

The original compressed image data may be stored in a file that describes elements of the image and their interrelationships. For example, the image elements may include a background layer and foreground text and graphic elements that appear overlaid on the background. Converting such a page description to a final rasterized data set is called compositing.

Sometimes it is useful to print personalized pages, for example, pages that have image elements in the foreground that differ from page to page, and other image elements in the background that are shared in common from page to page. If such pages are to be printed one after another, the computer typically repeats the entire compositing process or else changes groups of pixels in the frame buffer from page to page.

The process of generating personalized pages can be made faster using two frame buffers, one for a background layer of common elements, the other for the foreground layer of personalization elements. The pages are composited from the two frame buffers. By personalization, we mean, e.g., printing a large number of pages, which are alike in many respects and individually customized in others. For example, each page could have the same advertisement but a different mailing address and perhaps coupons targeted to the demographics of the intended recipient. To minimize storage requirements it is useful to store the elements of the page once and to composite the different pages in real time, as the pages are printed.

Page compositing can be accelerated by using a dedicated processor to decompress the elements of the page (contexts) and composite them in real time into a series of scan line data sets.

SUMMARY

In general, in one aspect of the invention, sets of pixel data defining parts of rasterized portions of an image are received. At least one of the parts of one of the rasterized portions of the image overlaps another part of that portion of the image, and the pixel data that defines the overlapping part includes mask data that identifies pixels of the overlapping part that are to be included in the image. The sets of pixel data are decompressed. The decompressed data are used to generate a series of the rasterized portions of the image including the pixels identified in the mask data. While each of the rasterized portions of the image is being used by a print engine, another of the rasterized portions of the series is being generated.

Implementations of the invention may include one or more of the following features. Compressed sets of pixel data defining parts of rasterized portions of a series of images are received, at least some but not all parts of the rasterized portions of the respective images in the series being different. The decompression, use, and generation is performed with respect to each of the images in the series.

Different parts may be received in different compressed forms. Each of the portions of the image is associated with a swath of scan lines of the print engine and each of the parts fits within (and in some cases spans) the swath. A page description in the form of two levels of linked lists is used to determine which of the parts to use and in what order to generate the rasterized portions.

An upper level one of the linked lists includes a list of objects that form the image, the objects being sorted in top-to-bottom order by portion, and, within each portion, in order of overlap from back to front. Each object entry in the upper level list points to entries in the lower level list. Each entry in the lower level of the two lists includes a pointer to a compressed mask that identifies pixels that are to be included in a specified compositing operation. Each entry in the lower level of the two lists also includes a pointer to a compressed array of values describing pixels.

Among the advantages of the invention are one or more of the following. Because objects may overlap arbitrarily to any depth, a wide variety of pages can be printed. Compression algorithms can be custom tailored for different contexts and for the masks and pixel values associated with a given context. The storage medium that stores the objects can be smaller and slower than if the objects were not compressed. Personalization of printed pages is easier and the resulting compositing is faster because personalization objects can be substituted easily in different pages.

DESCRIPTION

Figure 1:
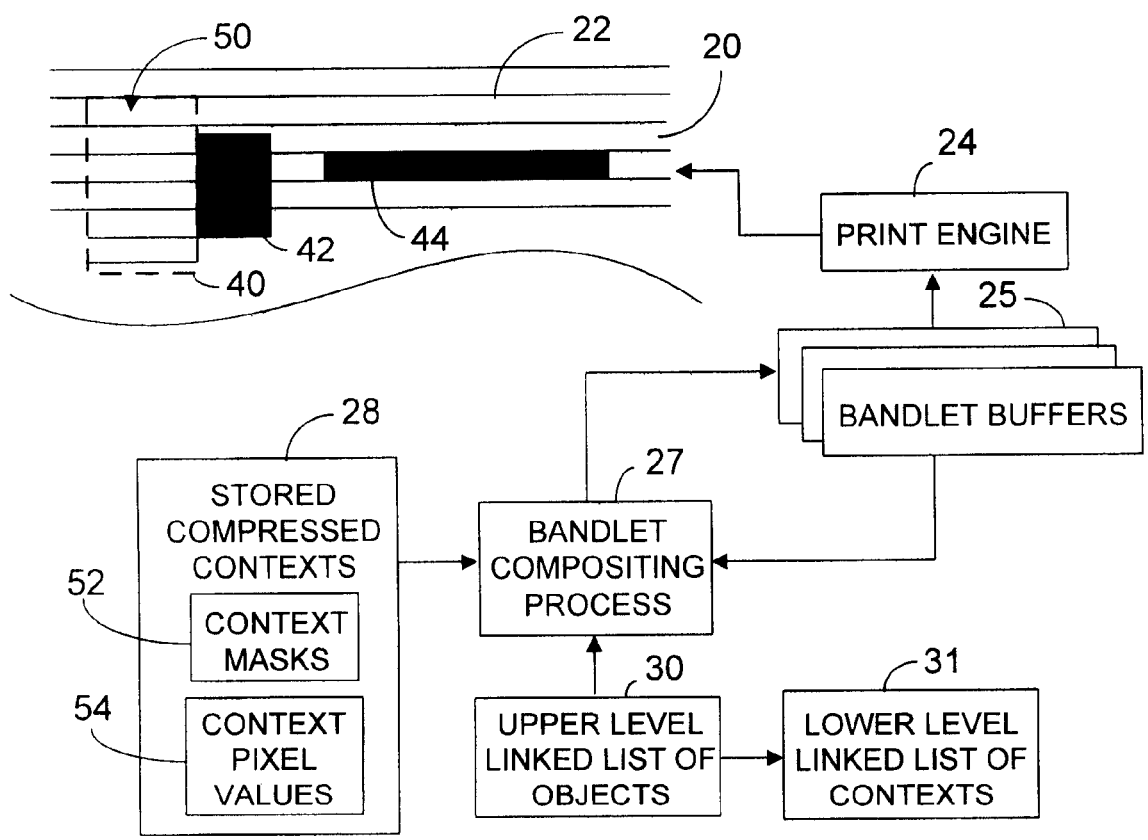
FIG. 1 is a schematic view of a page compositing system.

As seen in FIG. 1, a page 20 may be printed by a print engine 24 in a series of scan swaths 22 that extend from one side of the page to the other and lie one below another from the top of the page to the bottom. Each scan swath corresponds to a bandlet of rasterized pixel data that is delivered to the print engine through two or more bandlet buffers 25. Each bandlet is eight scan lines high or some other suitable height. Together the bandlets form an image that can include a variety of textual and graphical objects.

Other bandlet heights could be used. The shorter the bandlet heights, the smaller the buffers, which saves money. But the bandlet height should be large enough to accommodate decompression algorithms (e.g., JPEG requires eight lines). Because each context requires storage overhead, there is also an incentive to make the bandlet height larger.

Two bandlet buffers are provided so that, while one bandlet buffer is sending its pixels to the printer in raster order, another buffer can be receiving pixels of any bandlet that is being composited. Providing more than two bandlet buffers enables the compositing to get ahead of the printing.

The pixel data for each bandlet is composited into its bandlet buffer by a bandlet compositing process 27 performed by a dedicated circuit (for example, the circuit implementing rendering and compression techniques described in U.S. patent application Ser. No. 08/893,065, filed Jul. 15, 1997, incorporated by reference).

Each bandlet is composited from stored compressed contexts 28 that make up rectangular objects 40, 42, 44 that are parts of the image. For example, in a page for a magazine advertisement, one object 40 could be a photograph of a boat, and another object 44 could be block of text. AS shown by example in FIG. 1, object 40 is composed of contexts 50 each vertically spanning a single bandlet. Each stored context specifies the x and y locations and the height and width of its rectangular array of pixels. The context also identifies the compression algorithm that was used to compress it and contains pointers to a stored mask and pixel array described later.

Generally, the coordinates of a context are expressed relative to the coordinates of a referencing object. The relationship can be expressed in various ways. The y coordinate could be relative to the top of the current bandlet, since the location of the top of the bandlet relative to the object is known implicitly. Moreover, for a context known to span the bandlet from top to bottom, the y coordinate and height could be omitted.

An object, e.g., object 42, can overlap more than one bandlet. An object 40 can overlap another object 42 (the overlapped portion of object 42 is not shown). In one implementation, when one object overlaps another object, the compositing process simply replaces any underlying pixels of the overlapped object with the pixels of the overlapping object. In other implementations, more complex compositing approaches could be used.

The compressed contexts that make up the objects of a page are fetched from storage at a relatively low bandwidth, decompressed by the bandlet compositing process in real time (e.g., while the print engine is printing a prior bandlet), composited, and delivered to the print engine for printing at high bandwidth.

The bandlet compositing process 27 determines which contexts to use in which sequence for compositing each bandlet based on a page description that is stored in the form of two levels of linked lists, an upper level 30 and a lower level 31.

The upper level linked list 30 is a list of the objects that form the page. In the upper level list, the object entries are sorted first in top-to-bottom order by bandlet. For example, all entries for objects that appear in the first bandlet are at the top of the upper level list. Within the portion of the upper level list that pertains to a given bandlet, the objects are sorted in order of overlap from back to front. For example, for a given bandlet, an object that is behind another object appears earlier in the upper level list than the object that is in front of the first object.

Objects have a "back-to-frontness" coordinate. After an object has been processed in one bandlet, if it also appears in the next bandlet, it is placed in a temporary list. When processing the next bandlet, objects from the temporary list are merged with objects from the main upper level list in back to front order.

The arrangement of the upper level list simplifies the task of describing a variety of different pages based on a group of available objects. A user can easily personalize pages by including some common objects in all pages and different personalized objects in the respective pages.

Each object entry in the upper level list points to entries in the lower level list 31. The lower level list for an object is a list of contexts that make up the object, sorted primarily by bandlet, in top-to-bottom order, and secondarily within a bandlet in back-to-front order. The lower level linked list makes it easy to select different compression algorithms as appropriate for different contexts within a given object.

The two-level approach reduces the complexity of attempting to create a single list of contexts of all objects in all bandlets of a page. However, a one level approach also could be used.

Because each context is limited to one bandlet, once a context has been fetched and used in compositing a bandlet, the context can be discarded from memory or disregarded.

Although it is possible to use contexts that span more than one bandlet, doing so requires the system to keep a temporary list of contexts that have been written into one bandlet but also need to be written into one or more other bandlets. When the system is fetching contexts for a given bandlet, it must merge the temporary list entries with the other list entries so that contexts are processed in back-to-front order. Therefore, in this variant, each context must have an explicit back-to-frontness coordinate to serve as the basis for the merge process. These back-to-frontness coordinates affect the overlap order of contexts within an object but have no effect on the overlap order of objects.

Each context entry points to a compressed pixel array 54 and a compressed mask 52 that identifies pixels in the array that are to be included in the compositing operation. This allows some pixels of an overlapping context to be ignored so that the pixels of the overlapped context show through.

Because the mask and the pixel values are stored separately, the compression techniques used for the mask and the array may be different, which enables a better matching of compression scheme to the kind of data.

In operation, the bandlet compositing process treats each bandlet in turn. Within each bandlet, it processes each object in turn. And, for each object, it processes each relevant context in turn.

Figure 2:
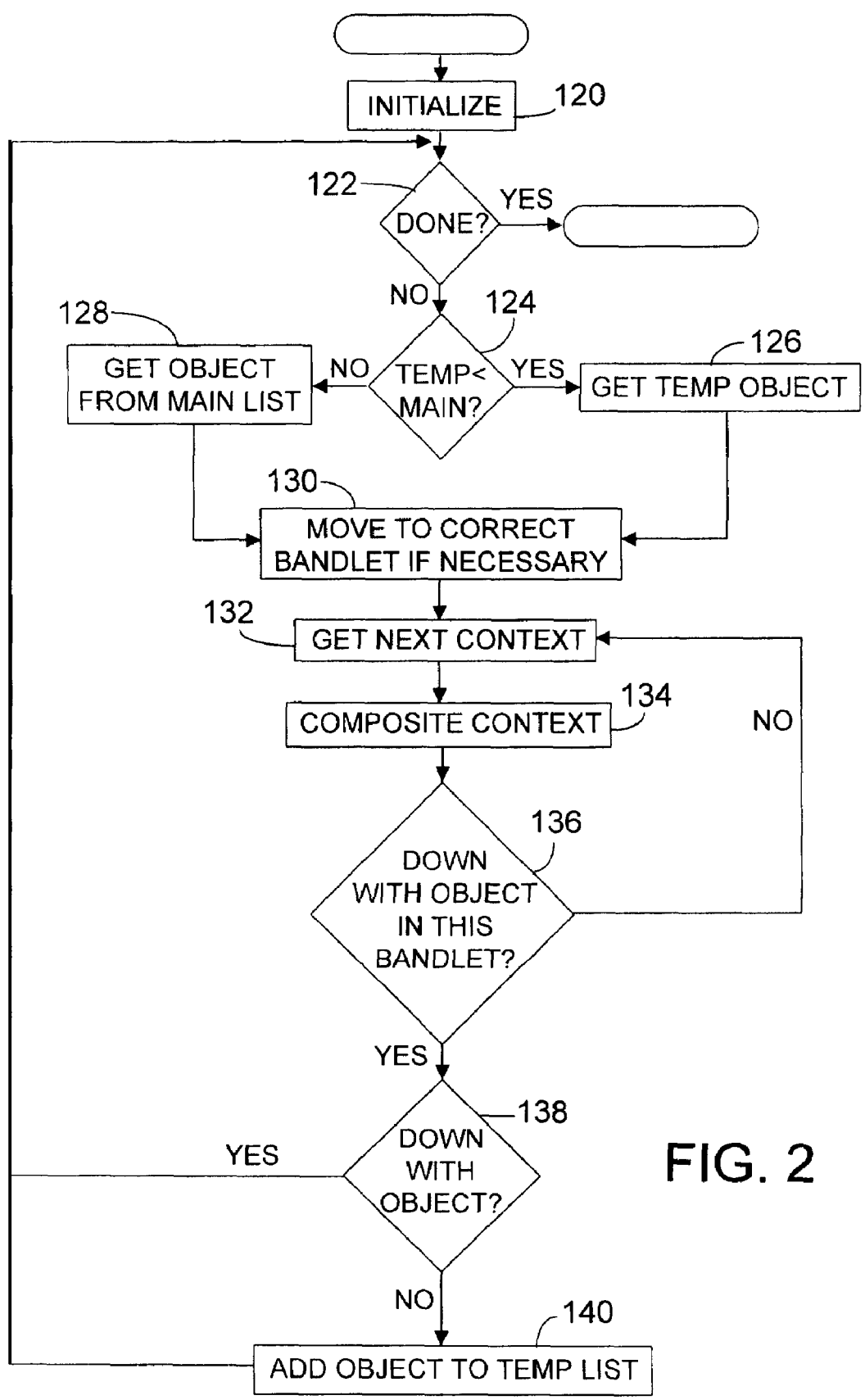
FIG. 2 is a flow chart of a bandlet compositing process.

As seen in FIG. 2, to begin compositing a page, data structures are initialized (120). The initialization includes clearing a queue of temporary objects and setting a pointer to the beginning of the list of objects that describe the page to be printed.

At step 122, if the queue of temporary objects is empty and there are no more objects in the object list, the composition process terminates. Otherwise, at step 124, the process selects the next object to process. If the queue of temporary objects is empty, the next object on the main object list is selected. If there are no more objects in the main object list, then the object at the front of the queue of temporary objects is selected.

If both a main object and a temporary object are available, the object with the smaller bandlet number is selected, or if their bandlet numbers are equal, the object with the smaller "back-to-frontness" coordinate is selected. If the temporary object is selected, then at step 126, it is fetched and removed from the queue. If the main object is selected, then at step 128, it is fetched and the pointer to the main object list is advanced to point to the next main object.

At step 130, if the bandlet number of the current object is larger than that of the previous current object then bandlet buffers are handed over to another process where they will be printed, and new bandlet buffers are acquired by the compositing process, until the proper bandlet buffer has been acquired for compositing this object. (In one example, the printing process assures that bandlet buffers acquired by the compositing process in this way have been properly initialized.)

Also at step 130, a context reader is initialized to point to the beginning of a list of contexts associated with the current object and the current bandlet.

At step 132, the next context is fetched, and at step 134, the compositing operation specified by this context is performed, as follows. The compressed mask pointed to by the context is fetched and decompressed. The compressed pixel array pointed to by the context is fetched and decompressed. Finally, pixels from the pixel array identified by the mask are composited into the bandlet buffer.

At step 136, if the current context is not the last context associated with the current object and bandlet, then control passes to step 132 to fetch the next context. Otherwise, control passes to step 138. At step 138, if the current object affects one or more subsequent bandlets, then at step 140 a temporary object is created to represent this object, and the temporary object is written to the queue of temporary objects, and control passes to step 122. Otherwise, control passes to step 122.

In the process of originally decomposing an image into contexts to be compressed and stored for later use in compositing, it is useful to select context areas that are similar in terms of the applicability of particular compression algorithms.

Figure 3:
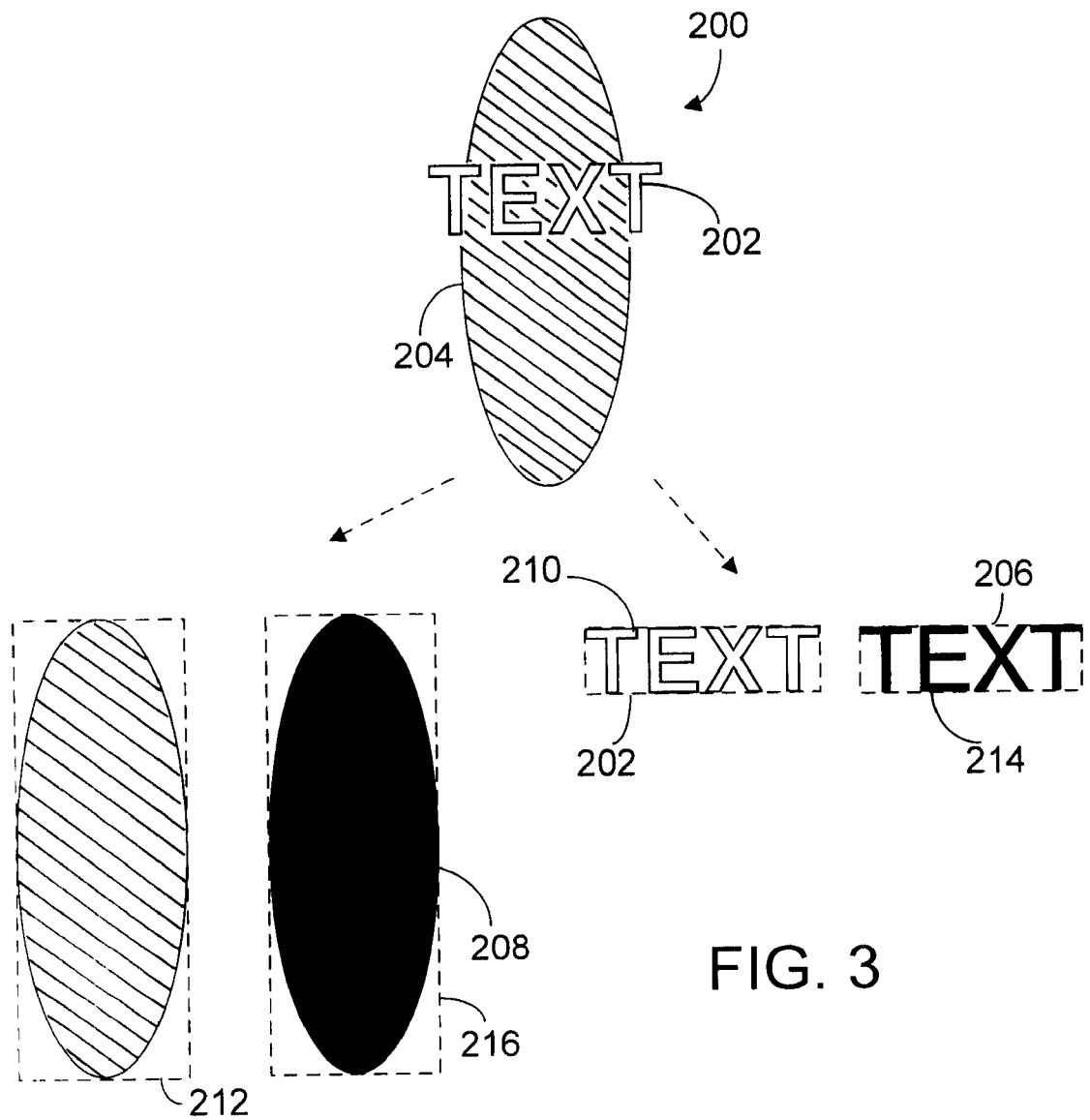
FIG. 3 illustrates decomposition of a page into objects.

In the example shown in FIG. 3, a simple image 200 is decomposed into objects to be stored. An object 202, "TEXT", is stored separately from the oval object 204 to permit the text to be reused to overlay other objects later.

Each object 202, 204 has a bounding box (shown by a dotted line around it), which represents the area to be compressed. Each area to be compressed is broken into contexts, as shown in FIG. 4.

Each object is stored as a mask 206, 208, and a related pixel value map 210, 212.

The dark part 214, 216 of each mask represents that portion of the object that would overlay any underlying objects in the image.

Figure 4:
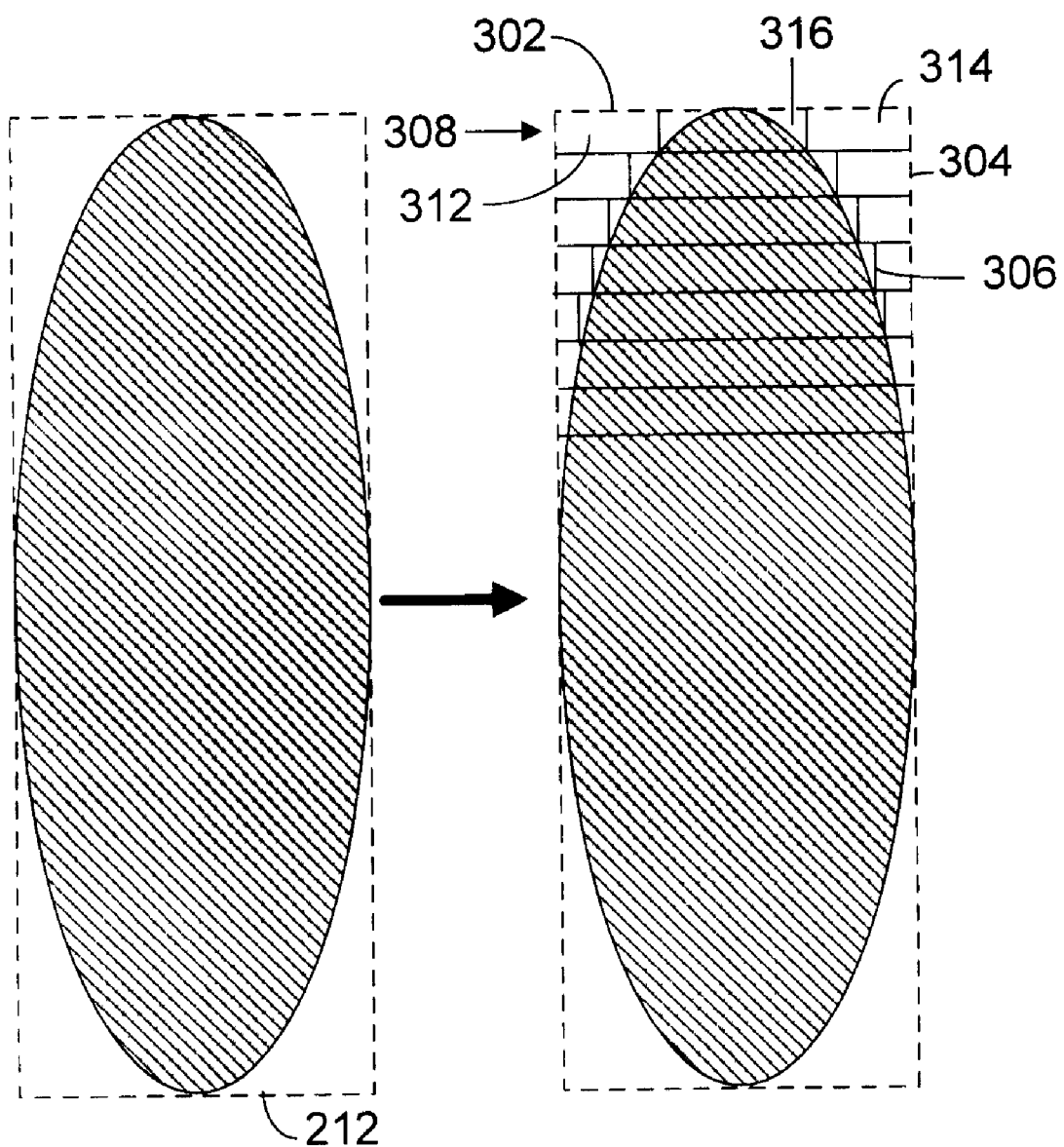
FIG. 4 illustrates of an object part into contexts.

As seen in FIG. 4, the pixel values are broken into contexts 302, 304, 306. The use of contexts enables parts of a bandlet to be broken into pieces to permit the user of efficient compression algorithms depending on context content. For instance, the topmost bandlet 308 is broken into three contexts. The leftmost and rightmost contexts 312, 314 in the bandlet contain uniform pixel values which can be compressed with a very high compression ratio using an appropriate algorithm). The center context 316 contains more complexity and would not compress well using the algorithm chosen for contexts 312 and 314. By defining context 316 separately, a compression algorithm that is better suited to the image structure in that context may be used which improves the overall compression ratio for the bandlet.

Other embodiments are also within the scope of the following claims.

What is claimed is:

1. A method comprising:
   processing an image to derive objects belonging to the image;
   forming contexts for each of at least one of the objects, each of the contexts being expressed as pixel values; and
   compressing different ones of the contexts using different compression algorithms based on the pixel values of the respective contexts.

2. The method of claim 1 in which each of the objects is stored as a mask and a pixel value map.

3. The method of claim 1 also including storing the compressed contexts.

4. The method of claim 3 also including compositing another image using one or more of the stored compressed contexts.

5. The method of claim 1, wherein processing an image comprises processing an image to derive objects including a text object.

6. A computer-readable medium bearing instructions to enable a data processing apparatus to:
   processing an image to derive objects belonging to the image;
   forming contexts for each of at least one of the objects, each of the contexts being expressed as pixel values; and
   compressing different ones of the contexts using different compression algorithms based on the pixel values of the respective contexts.

7. The medium of claim 6 in which the instructions also enable a data processing apparatus to store each of the objects as a mask and a pixel value map.

8. The medium of claim 6 in which the instructions also enable a data processing apparatus to store the compressed contexts.

9. The medium of claim 8 in which the instructions also enable a data processing apparatus to composite another image using one or more of the stored compressed contexts.

10. The medium of claim 6 in which the instructions also enable a data processing apparatus to process an image to derive objects including a text object.

* * * * *